Feb. 11, 1936.    R. E. CHOATE ET AL    2,030,352
EARTH MOVING DEVICE
Filed May 9, 1932    2 Sheets-Sheet 1
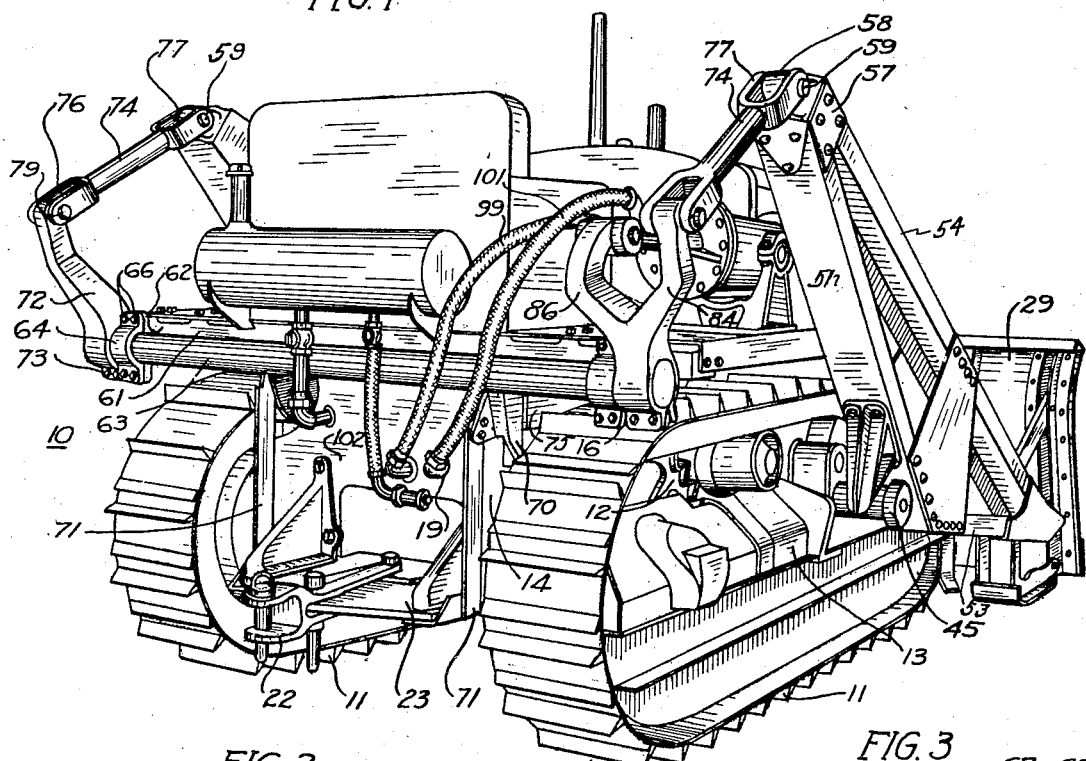
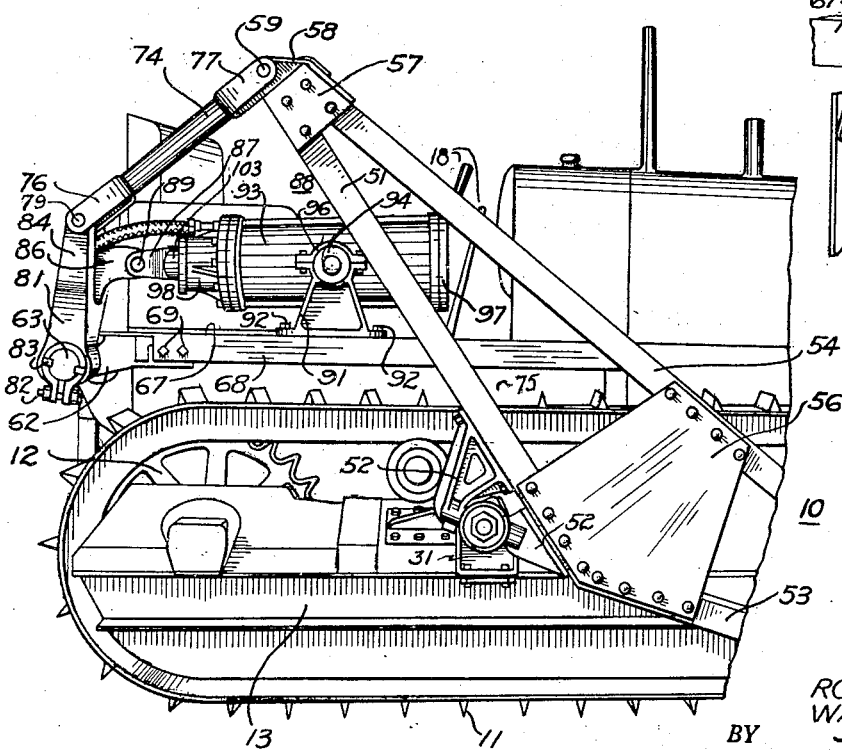
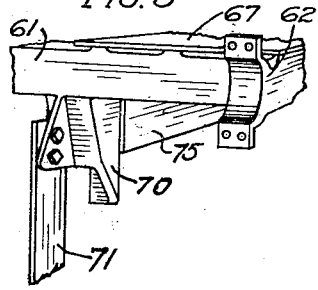
INVENTORS
ROY E. CHOATE
WALDO E. RODLER
BY Flournoy Corey.
ATTORNEY.

Feb. 11, 1936.  R. E. CHOATE ET AL  2,030,352

EARTH MOVING DEVICE

Filed May 9, 1932  2 Sheets-Sheet 2

INVENTORS
ROY E. CHOATE
WALDO E. RODLER

BY Flournoy Corey.
ATTORNEY.

Patented Feb. 11, 1936

2,030,352

UNITED STATES PATENT OFFICE 2,030,352

EARTH MOVING DEVICE

Roy E. Choate and Waldo E. Rodler, Cedar Rapids, Iowa, assignors to La Plant-Choate Manufacturing Company, Inc., Cedar Rapids, Iowa, a corporation of Delaware Application May 9, 1932, Serial No. 610,194

1 Claim. (Cl. 37—144)

Our invention relates to earth moving devices, the term "earth" being taken in its broad sense to include snow, ice and the like, and has particular relation to a means and structure for mounting and manipulating a plow, or like device, on a tractor.

It is known to the art to mount a plow or like device on a tractor by means of a framework which is pivotally engaged for vertical movement with reference to the tractor, and to move this frame and hence the plow by means of a hydraulic jack.

We have observed, however, that a mounting of the usual character is not entirely satisfactory because the tractor is surrounded by a framework which prevents use of the tractor for hauling other equipment, because parts of the plow-mounting-and-manipulating structure interfere with the draw bar and hauled equipment, or the parts thereof dig into the earth at times, and that a tractor cannot turn in a short radius because of the parts of the device. We have also observed that structures of the usual type are subject to considerable strain at the pivotal mounting of the plow-supporting framework because of warping and other undue stress at the bearings. The frameworks are often loose and wabbly, and stresses are set up in the tractor which should not be present, and that from these and other causes failures sometimes occur.

We have also observed that the plow-supporting and manipulating structure is often quite bulky and heavy and that in mounting the aforesaid structure on a tractor or the like special clamps and mounting platforms are required.

We have, therefore, conceived of a new and novel structure for supporting, operating, and manipulating a plow with reference to a tractor, and have devised means for overcoming the objections hereinbefore noted.

It is a general object of the present invention to provide a novel and improved form of earth moving device.

More particularly it is an object of the invention to provide in an earth moving device of the type in which a plow or the like is mounted upon a tractor or other prime mover, a novel mounting therefor and a novel means for manipulating and holding the plow with reference to the tractor.

An object of this invention is to provide, in a device of the above character, a mechanism and structure whereby the plow may be raised to an extremely high position or dropped to a level well below the lowest portion of the tractor, Another object of the invention is to provide a device of the above character so constructed that the hydraulical jack used for raising and lowering the plow is located at a position well out of the way of the draw bar and the mechanism adjacent thereto, so that the tractor may be used for hauling wheeled or other equipment without interference with the plow-manipulating mechanism.

Another object of the invention is to provide, in a plow mounting for a tractor, a means for manipulating a plow located at the front of the tractor, by a hydraulic device operatively connected to a pump located at the rear of the motor.

Another object of the invention is to provide means for taking directly on the tractor structure the spreading stress occasioned by the hydraulic ram.

Another object of the invention is to provide an extraordinarily stiff plow-supporting-frame so arranged that all the parts thereof are well above the ground at all times and out of the way, and such that the tractor may be turned in a short radius.

A feature of the invention is that the hydraulic ram is mounted directly upon a portion of the tractor framework and that the distance from the piston of the hydraulic ram to the actuating mechanism is quite short.

An important object of the invention is to provide a plow-manipulation system which will afford greatest lift at a point below the level of the ground on which the tractor rests.

Another object of the invention is to provide a pivotal mounting for the plow-supporting-frame, such that wrenching and twisting of the tractor or frame does not injure the parts of either structure or of the mounting, and in which a cross-shaft or cross-tie assists in taking unbalanced forces acting on the plow.

A feature of the invention is that the plow may be pushed down and held in that position.

A still further object of the invention is to provide a device of the above character which is simple, rugged, and reliable.

Other and further features and objects of the invention will be more apparent to those skilled in the art upon a consideration of the accompanying drawings and following specification, wherein is disclosed a single exemplary embodiment of the invention, with the understanding, however, that such changes may be made therein as fall within the scope of the appended claim.

without departing from the spirit of the invention.

In said drawings:

Figure 1 is a rear quartering view in perspective of a tractor on which a plow is mounted by means of a structure built according to our invention. The plow is shown in a lowered position such that it rests upon the ground.

Figure 2 is a view in side elevation of the plow supporting-and-manipulating structure showing particularly the hydraulic jack and link mechanism utilized for raising and lowering the rear of the plow-supporting framework. The front portion of the tractor and of the plow-supporting framework has been broken away to show the remaining structure in greater detail.

Figure 3 is a view in perspective to show details of construction of the mechanism used for manipulating the plow.

Figure 4:
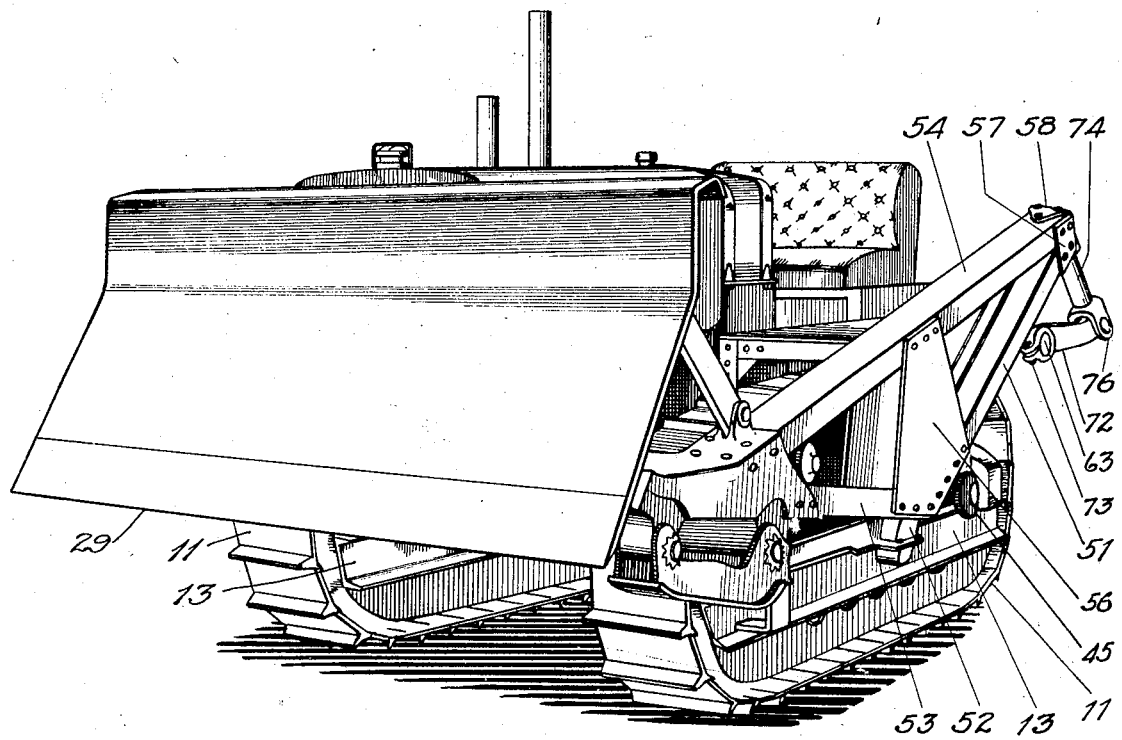
Figure 4 is a front quartering view of the left side of the tractor and plow-supporting and manipulating structure.

The present invention deals particularly with a plow mounting of the type wherein a supporting framework is mounted for pivotal movement on the tractor, and wherein the plow is mounted upon the front end of this frame and a hydraulic jack is operatively engaged to the rear of the frame, and the jack is mounted upon a horizontally extending portion of the tractor structure such as the running board. It is quite apparent, however, that the structure and portions thereof may be used or modified for use for other purposes. For instance, the structure might readily be provided with a shovel, a rake or the like, instead of a plow in order that material might be carried or moved about by the tractor.

Referring now to the drawings, there is shown at 10 generally a tractor of the type in which a pair of continuous treads 11 are mounted for movement on pairs of suitably sprocketed supporting wheels 12 which are effective to rotate the treads to drive the tractor.

The tractor is supported on a sub-frame 13 which connects the two wheels on each side and affords support for the chassis 14 of the tractor upon which are mounted the motor used in driving the tractor, the control mechanism 18, and the hydraulic control mechanism 19, which is connected to a suitable hydraulic pump mechanism (not shown). A draw bar 22 extends rearwardly from a suitable platform 23 at the rear of the tractor.

The tractor and hydraulic control mechanism per se are not the subject matter of the present invention except in their connection with the plow-supporting and actuating mechanism hereinafter more particularly described, but the mechanism and structure of the tractor are described in order to show how the plow is mounted thereon.

The plow-supporting structure and the means by which it is mounted on the tractor is not directly concerned with in the present invention except in its relation to the hydraulic jack and linkage mechanism used in actuating it, but for this reason is now briefly described. Two frameworks or trusses are used, one on each side of the tractor, and since the trusses are substantial duplicates of each other, except that they are complementary, only one will be completely described.

An upwardly-extending bracket 31 is mounted upon a horizontally-extending portion of the sub-structure 13. A shaft 45 is journaled for rotation in this bracket and another pair of brackets 52 is pivotally secured to this shaft. A beam 51, which is a part of the plow-supporting framework, is fastened on the brackets 52. This beam is a part of a truss structure or framework comprised by a beam 53 which extends substantially horizontally and forward from the shaft 45, and a third beam 54 which connects the two opposite ends of the beams 51 and 53. A plate 56 which connects the inner ends of the beams 51 and 53 and which is attached to the beam 54 acts as a stiffening member for the truss. The plow 29 is mounted on the front ends of the truss members in the usual manner. The structure, including the two truss members, the plow and the cross-shaft may be termed the "plow-supporting framework."

The rear ends of the beams 51 and 54 are connected by means of a plurality of plates which may be termed the "cap" 57. A bracket 58, at the end of the cap 57, is drilled to afford a bearing for a pin 59.

A heavy frame or beam 61 is mounted upon the rear of the tractor, being preferably mounted upon the rear of the transmission case of the motor, as by means of brackets 70. The beam extends entirely across the rear of the tractor and projects out over the link-belt running gear at each end thereof, and the beam constitutes part of a supporting structure, together with a pair of tension plates and other fittings and structures hereinafter described for jointly supporting a cross shaft 63. A pair of brackets 62 at opposite ends of the beam 61 extend rearwardly therefrom and are suitably recessed to afford bearings for the heavy cross-shaft 63 which is mounted at the rear of the tractor at a level just above the upper portion of the link-belt treads. Bearing caps 64 hold the cross-shaft in place and are bolted to the brackets 62 by means of bolts 66. The beam 61 also affords a mounting for a horizontally-extending platform or running board 67 which extends out over the opposite ends of the beam and is turned downwardly to afford a stiffening flange 68. The running board is provided with an unusually deep inner flange at 75, which may be a part of the running board or bolted to it and which is adapted to be fastened to the side of the crankcase and transmission case of the motor. The beam, the deep flange, and the running board afford an extremely stiff supporting structure well adapted to take the stresses set up by the hydraulic jack acting on the cross-shaft 63. The running board is bolted to the beam and the side of the motor as by means of bolts 69. Vertically-extending bars or tension plates 71 are attached to the opposite sides of the platform 23, to the transmission case of the tractor, and to the brackets 70 of beam 61, to afford a stiffening means for holding the beam in place.

A lever arm 72 is engaged on the left hand end of the cross-shaft 63, as by means of the bolts 73. This arm extends upwardly and a link 74, provided with yokes 76 and 77 at the opposite ends thereof, connects the upper end of the arm 72 with the rear end of the truss framework at the bracket 58. The pins 59 and 79 pass respectively through the bracket 58 and the upper end of the lever 72, to connect the lever arm with the rear of the truss framework. The cross-shaft and lever arms may be termed the "plow-supporting framework actuating mechanism."

A second lever arm 81 is provided at the right end of the cross-shaft 63 and this lever arm is secured to the shaft by means of bolts 82. The lever arms 81 are preferably keyed to the shaft 63 by means of keys 83. The upper end of the lever arm is bifurcated to provide arms 84 and 86. The upper end of the arm 84 is connected to the rear of the right hand truss by means of a link 76 which is a duplicate of the link used at the left side of the tractor. The arm 86 is bent forwardly in order that a cross-head 87 of the hydraulic jack 88 may be pivotally connected thereto as by means of a pin 89.

The hydraulic jack 88 is pivotally mounted on a bracket 91 which is attached to the horizontally-extending portion of the running board 67, as by means of bolts 92. The bracket 91 is bifurcated to afford a cradle for the cylinder 93 and the upper ends of bracket 91 are provided with suitable recesses or bearings so that stub shafts 94 on the sides of the cylinder may be journally mounted on the brackets. Bearing caps 96 hold the stub shafts in place.

The cylinder 93 is provided with the usual caps 97 and 98 having openings therein (not shown) for the admission and escape of the oil or other fluid used for operating the hydraulic jack. The openings in the respective caps are connected by means of hose connections 99 and 101 to a hydraulic pump (not shown) at the rear of the transmission case 102. Suitable valves (not shown) are located in these supply lines in order to apply pressure to one end or the other of the jack in a manner well known in the art, and it may be readily understood that a piston within the cylinder will be moved back and forth to drive the piston rod 103, which extends through the rear cap 98, back and forth to move the lever arm 86, or that the piston may be locked by closing the supply lines.

The pivotal mounting of the hydraulic jack 88 permits the cylinder to rotate sufficiently to allow for the eccentricity of the lever arm 86. It is apparent that the front and rear movement of the lever arm 86 causes a corresponding front and rear movement of the lever arms 72 and 84 to push up or pull down the rear ends of the right and left hand truss members through the agency of the links 74.

It may readily be understood that pulling down of the rear of the truss members operates to raise the plow 29 which is mounted at the front of the tractor, while a forward movement of the lever arms 72 and 84 results in raising the rear of the truss member and lowering the plow. This action is positive and the piston may be locked in place by means of the hydraulic valve used in controlling the flow of fluid to and from the jack. Consequently, if desired, the plow may be driven downwardly with considerable force to a position well below the level of the ground upon which the tractor rests and held in this position, or the plow may be raised well above the level of the ground. The plow may be held at any desired intermediate position.

It is to be noted that the hydraulic jack is mounted at a position well out of the way of any appliances located at the rear of the tractor and that no special framework, with the exception of the supporting brackets, is needed for mounting the jack. The lever arms for actuating the rear of the truss members extend upwardly so that they, too, are out of the way of the equipment located at the rear of the tractor. The cross-shaft is attached to a portion of the tractor framework which is well above the ground and which does not interfere with the hydraulic mechanism nor with the draw bar and hauled equipment. The actuating mechanism is of an extremely simple, rugged and reliable nature.

It is to be noted that the plow-supporting framework is entirely outside of the tractor and that the mechanism is not interfered with by any part of the tractor, and that the structure is such that an extremely high lift of the plow and a drop well below the link belt tread may be secured.

It is apparent that the structure may be considerably modified by those skilled in the art without departing from the spirit and the scope of the invention as set forth in the appended claim.

Having thus described our invention, what we claim as new and desire to secure by Letters Patent is:

In a plow supporting and actuating mechanism including a tractor, a beam extending across the rear of the tractor and secured to the transmission case thereof, the beam projecting beyond the sides of the transmission case to either side of the tractor, a running board secured to the side of the crank case and to the beam to thus afford a platform, a cross shaft mounted for rotation on the beam and the beam having suitable bearings for so mounting the cross shaft, a hydraulic jack pivotally mounted on the platform formed by the running board, crank arms on the end of the cross shaft, the ram of the hydraulic jack being pivotally connected to one of said crank arms.

ROY E. CHOATE.
WALDO E. RODLER.